Dec. 4, 1962  N. WITTLICH ET AL  3,066,650
SELF-OPERATED LIVESTOCK-WATERING PASTURE PUMP
Filed Feb. 10, 1961  2 Sheets-Sheet 1

INVENTORS
Norbert Wittlich
Axel Gill
by Malcolm W. Fraser
attorney

Dec. 4, 1962 N. WITTLICH ETAL 3,066,650
SELF-OPERATED LIVESTOCK-WATERING PASTURE PUMP
Filed Feb. 10, 1961 2 Sheets-Sheet 2

INVENTORS
Norbert Wittlich
Axel Gill
by Malcolm W. Fraser
attorney

United States Patent Office 3,066,650
Patented Dec. 4, 1962

3,066,650
SELF-OPERATED LIVESTOCK-WATERING PASTURE PUMP
Norbert Wittlich, Hagemer Kirchweg 26, Datteln, Westphalia, and Axel Gill, Moltkestr. 18, Lunen, Westphalia, Germany
Filed Feb. 10, 1961, Ser. No. 88,423
Claims priority, application Germany Feb. 11, 1960
6 Claims. (Cl. 119—75)

The invention relates to a self-operated livestock-watering pasture pump and its starting point is those self-operated livestock-watering pasture pumps in which the watering pan is attached to a lever which serves if required as an inlet pipe leading to the watering pan and fed by the pump and is connected on the other hand to the pump.

In the known self-operated livestock-watering pasture pumps of this type, the pans or bowls are fundamentally fixedly attached to the lever serving if required as an inlet pipe and thereby necessarily perform a movement extending along an arc around the pivot point of the lever. This movement, however, does not coincide with the normal head movement of the animal when drinking, so that the animal is compelled to make a movement which is unnatural in itself and this impairs the pleasure it takes in working the self-operated livestock-watering pasture pump. Moreover, in such self-operated livestock-watering pasture pumps there is a danger of the water getting into the animal's nostrils, which likewise deters it from using such pumps.

By means of the invention, the drawbacks of this pasture pump are eliminated. The invention proposes, in a self-operated livestock-watering pasture pump in which the watering pan is attached to a lever which itself serves if required as an inlet pipe leading to the watering pan and fed by the pump and is connected on the other hand to said pump, that the pan be mounted on a lever swinging in a vertical plane about its lower end.

In this way, the watering pan is arranged completely free and unimpeded above the pump, so that during the drinking movement, which takes place in an entirely natural manner in the present case, there will be no obstacle to the animal's head. Moreover, owing to this arrangement, the result is obtained that the movement of the watering pan can adapt itself to the natural drinking movement of the animal far better than is possible in the known watering means for livestock.

Thus, a four-joint link transmission is obtained in which it is possible, by mutual suitable arrangement of the joints, to give the freely projecting watering pan the desired course of movement during its movement to and fro above the pump.

Advantageously, the watering pan comprises a bowl-shaped main part which is in communication by way of an aperture with a space located behind a push plate. This space located behind the push plate is so shaped that as the watering pan is being pushed back when the animal is searching for water, a supply contained in said space is emptied into the bowl-shaped main part and thereby gives the animal a fresh stimulus to continue to push the pan back. However, when the watering pan is pushed further forward, the supply of water in the main part recedes below the head of the animal, so that the animal relaxes its pressure on the push plate, whereby the watering pan attempts to return to its initial position and in this process water is fed into the watering pan by way of the pump through the lever acting as an inlet pipe.

In the inoperative position of the pump, a slight trace of water which provides the stimulus is left in any case in the lowest part of the watering pan and, when the animal begins to drink, is supplemented owing to the slight upward movement of said watering pan from the supply located behind the push plate, while, on return of the watering pan to its initial position, the full quantity of water delivered by the pump is fed into the watering pan with the exception of a small residual amount left behind the push plate. It has been found that the animals become very rapidly accustomed to operating the pump in the manner described even several times in succession.

In this way the pan may also be guided by means of a rope or cable instead of the link, said rope or cable being led to the watering pan from a fixed point on the base plate over a roller mounted on the lever.

Two embodiments of the object of the invention are illustrated in the drawing, in which.

Figure 1:
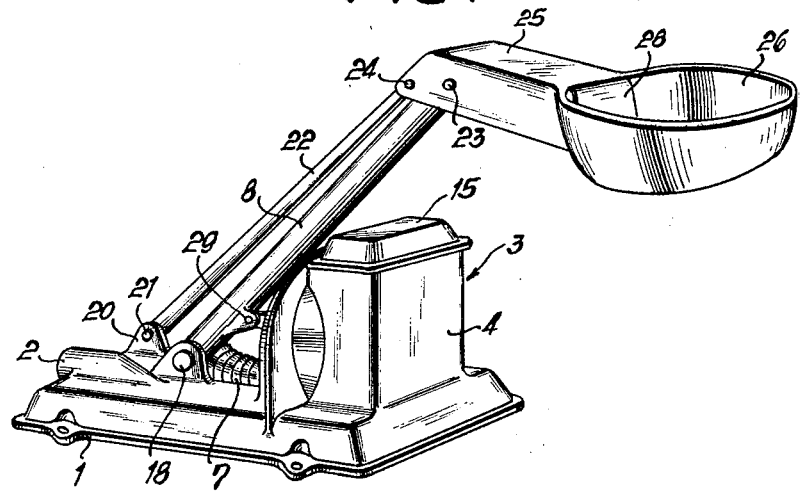
FIG. 1 is a perspective view of a pasture pump according to the invention.
Figure 2:
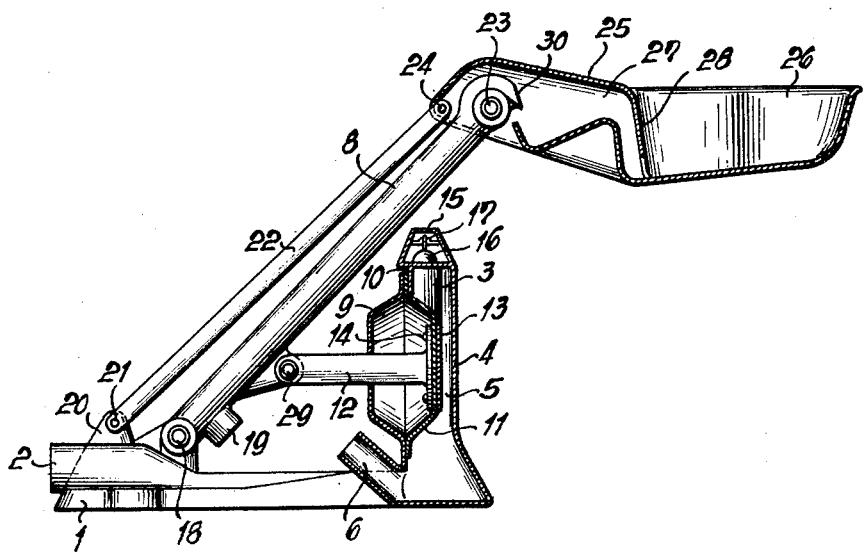
FIG. 2 is a side view of the pasture pump according to FIG. 1 with parts in section taken on a longitudinal center line.

There will be seen in FIGS. 1 and 2 a base plate 1 which, as shown in FIG. 2, contains a supply connection 2 leading upwardly to the pump casing 3 behind the plane of FIG. 2. The embodiment of the object of the invention illustrated is a livestock-watering arrangement which is equipped with a diaphragm pump. The casing consists of a front part 4 which accommodates at the same time the feed duct 5 leading to an outlet connection 6 through which the pumped water is fed by way of a siphon pipe 7 to the supporting pipe 8. The second part of the pump is the cover plate 9 which clamps the diaphragm 11 between the wall 10 of the casing and itself. Mounted on the diaphragm is the operating rod 12 which is connected to the diaphragm by way of a plate 13 and a suitable number of screw connections 14. On the casing is mounted a head portion 15 accommodating the outlet valve 16. In the livestock-watering arrangement according to the invention, a bell valve is preferably employed and is guided in the part 15 by means of a valve stem 17. This form of valve is advisable in particular because such valves can be operated very easily and do not constrict the flow cross section. The delivery of the pump into the watering pan disposed above it is thereby promoted. The pipe 8 is mounted on the base part 1 by means of a joint 18 and receives at 19 the flexible siphon pipe 19 communicating with the connection 6. Also mounted on the base part 1 is a bearing bracket 20 which receives one end of a link 22 in a joint 21. The other ends of the supporting pipe 8 and the link 22 are likewise provided with joints 23 and 24, respectively. These joints are connected to a part 25 containing the watering pan. This part contains in its front zone the bowl-shaped main part 26 of the watering pan which is separated from a rear space 27 by the push plate 28. The part 27 has a step-shaped base, so that a small storage pan is formed behind this step.

The supporting pipe 8 is also articulated to the operating rod 12 at 29. The pipe 8 opens freely at its upper end at 30 into the part 27.

Figure 3:
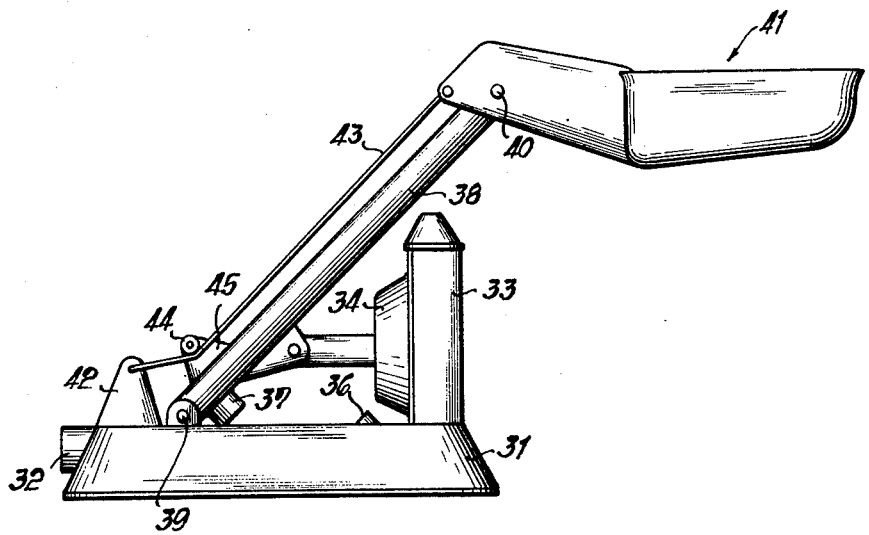
FIG. 3 is a side view of another form of construction in its lowest position.
Figure 4:
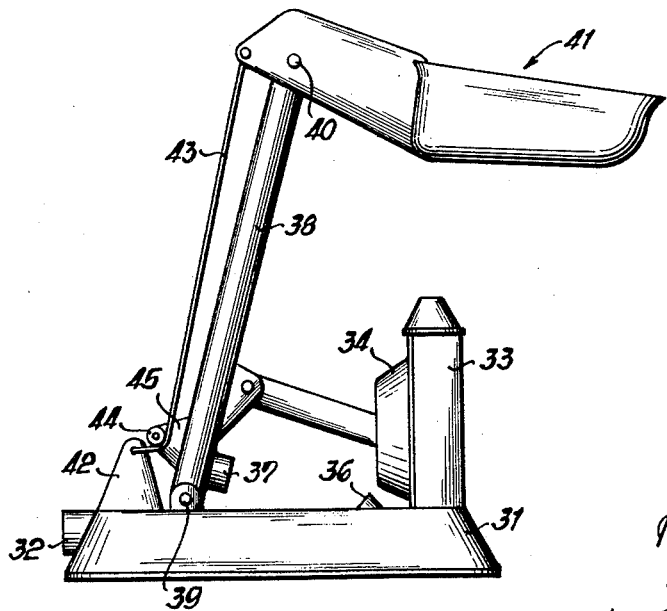
FIG. 4 is a side view of the pasture pump according to FIG. 3 in its upper position.

In the form of construction according to FIGS. 3 and 4, the reference 31 again denotes a base plate which contains a supply connection 32 leading upwardly to the pump casing 33 behind the plane of the two figures. The embodiment of the object of the invention is illustrated in a livestock-watering arrangement which is equipped with a diaphragm pump 34. An outlet connection 36 leads out of the diaphragm pump and is connected to the connection 37 of the supporting pipe 38 by way of a siphon pipe (not shown). The supporting pipe 38 is mounted on the base plate 31 by way of a joint 39. At its other end, the pipe carries a watering pan 41 by way of a joint 40. It will be seen that in the present case the guiding of the watering pan is carried out by means of an element 43 stretched tight between said watering pan 41 and a bearing bracket 42, which element may be a rope or cable, belt or the like. This stretched element runs behind a roller 44 mounted on a bearing bracket 45 fitted to the supporting pipe. The element 43 has the same function, in co-operation with the roller 44, as the link extending alongside the supporting pipe.

We claim:

1. In a self-operated livestock watering pasture pump comprising in combination a watering pan, a ground engaging base, an elongate supporting member having its ends pivotally connected to said watering pan and said base respectively, said supporting member providing communication between a source of water and said watering pan, self-leveling means connected between said watering pan and said base for maintaining said watering pan in a generally horizontal position during movement of said watering pan through a vertical plane, and pump means connected to said support means for pumping water from the water source to said watering pan upon the pivotal movement of said supporting member about its pivotal connection to said base.

2. The invention defined in claim 1 wherein said means connected between said watering pan and said base for maintaining said watering pan in a generally horizontal position comprises a linkage member having its ends pivotally connected to said watering pan and said base respectively and extends substantially parallel to said supporting member.

3. The invention defined in claim 1 wherein said watering pan consists of a bowl-shaped main portion and a rear portion, and a generally vertically disposed push plate between the main portion and the rear portion of said watering pan.

4. The invention defined in claim 3 wherein the rear portion of said watering pan is provided with a step-shaped base thereby forming a water storage zone and the pump means comprises a diaphragm type pump.

5. The invention defined in claim 1 wherein said means connected between said watering pan and said base for maintaining said watering pan in a generally horizontal position comprises tightly stretched flexible cable means having its ends connected to said watering pan and said base respectively.

6. The invention defined in claim 5 wherein a roller is attached to said supporting member and adapted to roll on said cable means.

References Cited in the file of this patent

FOREIGN PATENTS

| | | |
|---|---|---|
| 514,799 | Belgium | Oct. 31, 1952 |
| 697,470 | Great Britain | Sept. 23, 1953 |